United States Patent [19]

St. Clair

[11] Patent Number: 4,655,128
[45] Date of Patent: Apr. 7, 1987

[54] BULK MATERIAL COMPRESSOR

[76] Inventor: Rodney St. Clair, Rte. 6, Box 6523, Nampa, Id. 83651

[21] Appl. No.: 762,285

[22] Filed: Aug. 5, 1985

[51] Int. Cl.⁴ .............................................. B65G 3/04
[52] U.S. Cl. ...................................... 100/145; 141/67
[58] Field of Search .................... 17/40; 100/100, 145, 100/150, 904; 141/67, 68, 114

[56] References Cited

U.S. PATENT DOCUMENTS

| | | | |
|---|---|---|---|
| 1,331,017 | 2/1920 | Leumann | 100/145 |
| 1,728,394 | 9/1929 | Cornell et al. | 141/68 X |
| 1,848,236 | 3/1932 | Anderson | 17/40 |
| 2,279,640 | 4/1942 | Ringmarck | 17/40 X |
| 2,765,899 | 10/1956 | Ballard | 100/145 X |
| 3,222,853 | 12/1965 | Michael | 100/145 X |
| 3,230,902 | 1/1966 | Grimm et al. | 100/904 X |
| 3,687,061 | 8/1972 | Eggenmuller et al. | 141/114 X |
| 4,256,035 | 3/1981 | Neufeldt | 100/145 |
| 4,412,567 | 11/1983 | Kosters | 141/114 |
| 4,567,820 | 2/1986 | Munsell | 100/145 X |

FOREIGN PATENT DOCUMENTS

| | | | |
|---|---|---|---|
| 110984 | 6/1944 | Sweden | 141/67 |
| 753748 | 8/1980 | U.S.S.R. | 100/145 |

*Primary Examiner*—Stephen Marcus
*Assistant Examiner*—Mark Thronson
*Attorney, Agent, or Firm*—Paul F. Horton

[57] ABSTRACT

Apparatus for compressing bulk material into a storage bag including a hopper, an auger tube having an inlet port and a discharge port, an auger rotatably mounted within the auger tube, and a storage bag support framework affixed to the auger tube at its discharge end. The auger extends through the discharge port and into the area defined by the storage bag support framework to permit lateral displacement of the bulk material from the auger into the storage bag support and then into the storage bag. The auger preferably extends through the discharge port a distance of at least one flight; the pitch of the flights being shorter than those within the auger tube. The auger is unsupported adjacent the discharge port except by a pilot shaft which engages the compressed material within the storage bag.

3 Claims, 4 Drawing Figures

BULK MATERIAL COMPRESSOR

BACKGROUND OF THE INVENTION

1. Field of the Invention

This invention relates in general to bulk material compressing devices and, more particularly, to devices for filling a storage bag with grain, ensilage, hay, saw dust, and other bulk materials.

2. Description of the Prior Art

The desirability of storing bulk materials in plastic bags is widely becoming known since the invention of Alfred Eggenmuller et al as disclosed in U.S. Pat. No. 3,687,061. Prior to the Eggenmuller invention, little was known of the art of such bagging devices, except for the bagging of materials for disposal such as taught by the invention of H. F. Michael, U.S. Pat. No. 3,222,853.

Building upon the art of Eggenmuller are the inventions of L. J. Kosters, shown in U.S. Pat. Nos. 4,412,567 and 4,484,606. The primary problem with the above specified inventions is twofold—the lack of proper compression within the storage bag and excessive compression within the auger tube. Both Eggenmuller and Kosters force material out of a discharge port in a single direction, ie., along the longitudinal axis of the auger and auger tube without control or effect on the bulk material once it leaves the discharge port. The result is poor compression within the storage bag. The Kosters inventions have the additional problem of having an auger support bearing and bracket located immediately adjacent the discharge port which prevents unobstructed movement of the compressed mass at a most crucial juncture.

SUMMARY OF THE INVENTION

The present invention overcomes the problems of the prior art by providing an auger which extends beyond this discharge port of the auger tube into the area defined by the bag support framework. The auger, thus situated, provides not only the compression along the longitudinal axis of the auger but also provides a lateral compression about the radius of the auger, moving and compressing the bulk materials in their engagement with the bag support framework. A thorough description of the invention may be found in the specification and the claim which follow.

It is therefore a primary object of the present invention to provide apparatus for compressing bulk material into a storage bag which includes an auger which extends beyond the discharge port of the auger tube into the area defined by the storage bag support framework.

More particularly, it is an object of the present invention to provide apparatus for compressing bulk material into a storage bag which includes an auger which extends beyond the discharge port of the auger tube at least for a distance of one flight of the auger.

Still more particularly, it is an object of the present invention to provide apparatus for compressing bulk materials into a storage bag which has at least one flight extending beyond the discharge port, such flights being of shorter pitch than the pitch of flights within the auger tube.

Another object of the present invention is to provide apparatus for compressing bulk materials into a storage bag which includes an auger which is without direct bearing support adjacent the discharge port of the auger tube.

Likewise, it is an important object of the present invention to provide apparatus for compressing bulk materials into a storage bag which includes an auger provided with a pilot shaft extending coaxially from the free end of the auger for engaging bulk materials; the bulk materials providing a bearing support for the auger.

Additional objects and advantages will become apparent in the more thorough and comprehensive understanding may be had from the following description taken in conjunction with accompanying drawings forming a part of this specification.

DETAILED DESCRIPTION OF THE INVENTION

Figure 1:
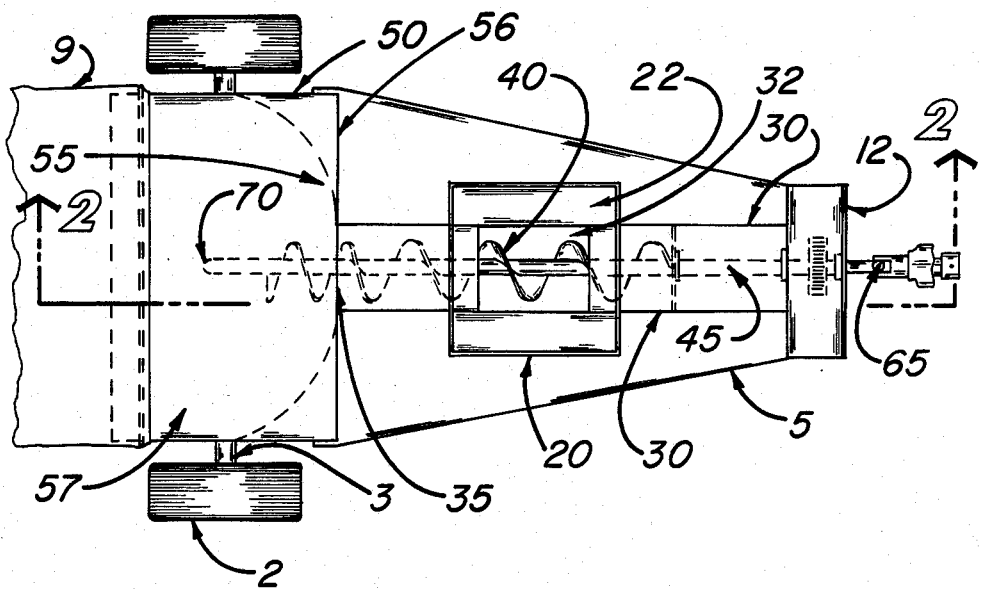
FIG. 1 is a plan view of the preferred embodiment of the present invention.
Figure 2:
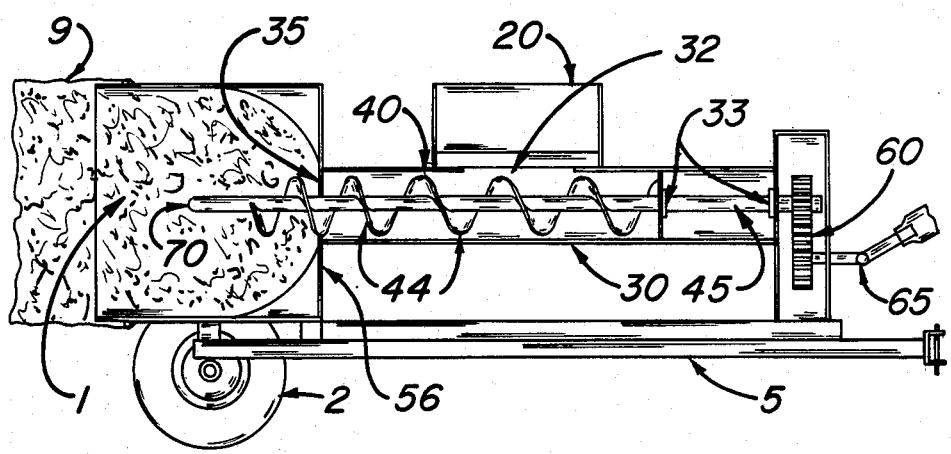
FIG. 2. is a section view taken along lines 2—2 of FIG. 1.
Figure 3:
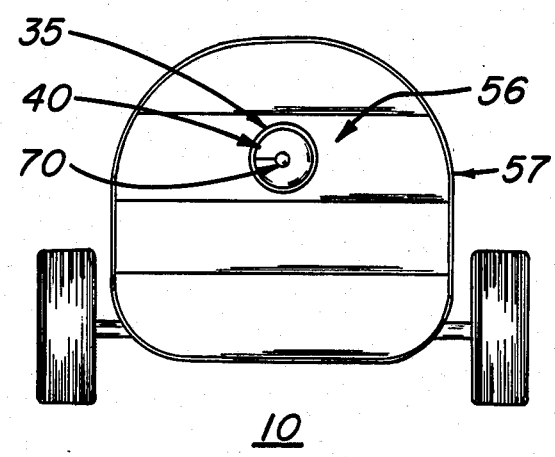
FIG. 3 is a rear view of the apparatus of FIG. 1.

Referring now to the drawings, an embodiment to be preferred of apparatus 10, for loading bulk materials into a storage bag, made according to the present invention is disclosed. Apparatus 10 includes generally a support structure including frame 5 mounted upon an axle 3 carried by rotatably mounted wheels 2; a hopper 20; auger tube 30; auger 40; and bag support means 50.

Hopper 20 may be of any convenient size or shape. In the embodiment shown, the hopper is provided with four walls 22 converging to opening 32 of auger tube 30. An elevator, not shown, may be used to load the hopper.

Located below the hopper and horizontally extending between gear housing 12 and bag support means 50 is auger tube 30. The auger tube is provided with an opening 32 on its top surface for reception of bulk material from the hopper and is provided at it rearmost end with a discharge or outlet port 35. Auger tube 30 terminates vertically flush with framework 55 of the bag support means to which it is affixed and into which its contents are discharged. The auger tube is circular in cross section and may be of any suitable diameter, being slightly larger in diameter than the auger.

Rotatably mounted within auger tube 30 and coaxial therewith on support bearings 33 is auger 40. Shaft 45 of the auger rotatably engages and is supported by any desired number of bearings 33. The bearings, however, for proper operation of the apparatus must be located adjacent the opposing end of the auger tube from the discharge port and not rearward of hopper opening 32 of the the auger tube.

Placement of structural support bearings toward the discharge end of the tube presents an obstruction to the passage of the bulk material and it is to be avoided, it being an important part of the invention that the portion of the auger adjacent the discharge port be freely extending. Obviously, there is considerable stress on bearings 33 because of the fully extending auger and for this reason the auger is provided on its free end with a pilot shaft 70, circular in cross section and having a smooth outer surface. The pilot shaft is coaxial with the shaft of the auger and may be an extension thereof. The length of the pilot shaft beyond the terminal most flight of the auger should be at least as long as the diameter of the auger in that the pilot shaft engages and rides upon compressed material, the compressed material itself serving a support bearing.

Figure 4:
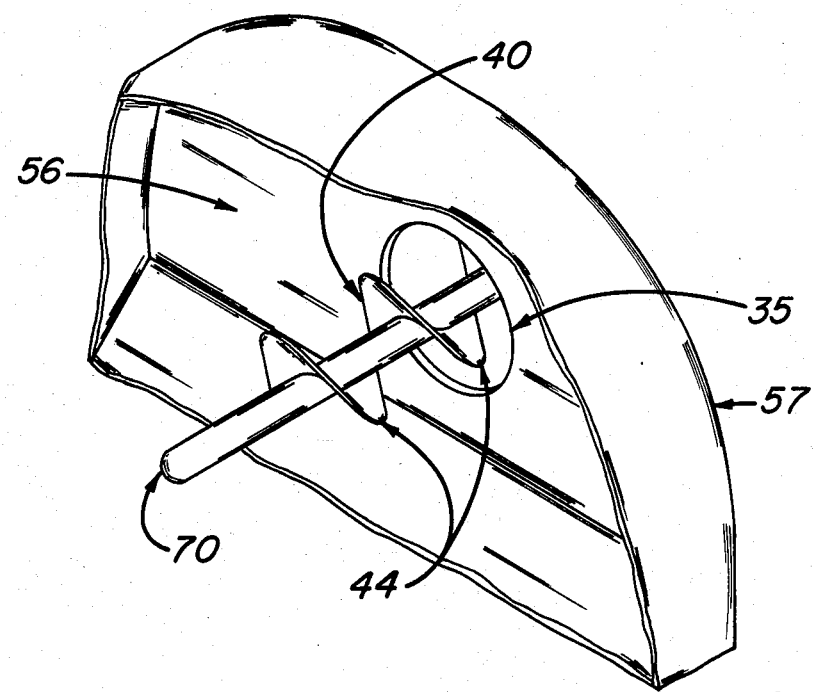
FIG. 4 is a perspective view showing the extension of the auger through the discharge port and into the space defined by the bag supporting framework.

It is critical to the present invention that the auger extend beyond the discharge opening 35 into the area defined by framework 55 of support means 50. This for the reason that augers extending only to the end of the auger tube provide compression in one direction, the rearward direction, only; lateral compression being prevented by the rigid walls of the auger tube. It has been found that where the flights of the auger, designated generally by the numeral 44, extends rearwardly from the auger tube at least a distance of one flight, ie, the distance from crest to crest of the auger, that the auger provides a lateral compression of the bulk material forcing the material radially, relative to the longitudinal axis of the auger, in all directions. Such lateral compression provides greater compaction of the material within the bag support framework and thence in the storage bag itself and also prevents excessive drag or compression at the discharge port of the auger tube. The advantage of the auger extending beyond the discharge port can readily be appreciated by viewing FIG. 4

While the pitch of the flights may be the same throughout the length of the auger, it is preferred that the pitch of the flights extending beyond the auger tube into the bag support framework be shorter to provide a slower rate of movement of the material once exiting the discharge port of the auger tube.

The auger is driven through a gear system 60 located within gear housing 12 by means of a power take-off from the pulling tractor, not shown. Conventional U-joints 65 are used for proper rotational translation of power between the tractor and the gear system.

Bag support means 50, in the preferred embodiment, includes a framework 55 which is tubular in construction, having a vertical front wall 56, through which the discharge port 35 of the auger tube opens and through which auger 40 rearwardly protrudes, and a tubular sidewall 57 diverging from front to back. Carried about the circumference of sidewall 57, on its exterior surface, is storage bag 9. The storage bag slips from the sidewall as the compressed material fills the bag.

In operation, the bulk material 1 is fed into hopper 20 where it drops through opening 32 into auger tube 30. As auger 40 rotates the bulk material is carried rearward by the flights of the auger, exiting tube 30 through discharge port 35. Framework 55 first fills, with the portion of the auger extending beyond the discharge port causing both the rearward compression and a radial compression of the bulk material causing the material to entirely fill the framework. Once the framework is filled, the material is forced rearwardly filling storage sack 9, preferably composed of polyethylene. The bulk material is thus protected from the weather; allowed to ferment where applicable; and is readily obtained for use merely by slitting the bag.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Apparatus for loading bulk material into a storage bag, said apparatus comprising:
   a hopper;
   a substantially horizontal auger tube, said auger tube opening into said hopper for receiving bulk materials therefrom, and said auger tube provided with a discharge port for discharge of the material;
   bag support means affixed to said auger tube adjacent said discharge port, said bag support means being of greater cross-sectional diameter than said auger tube; and
   an auger rotatably mounted within said auger tube substantially coaxial with said tube, said auger extending beyond said discharge port into said bag support means; the pitch of the portion of said auger extending beyond said discharge port being shorter than the pitch of that portion of said auger contained within the auger tube.

2. The apparatus as described in claim 1 wherein said auger extends beyond said discharge port of said auger tube at least one flight.

3. The apparatus as described in claim 1 wherein said auger includes a terminal free end, a pilot shaft at said terminal end, said pilot shaft being substantially coaxial with said tube, circular in cross-section, and having a smooth outer surface for engaging compressed bulk material within said bag support means to provide a bearing support for said auger.

* * * * *